US012631873B2

(12) United States Patent
Johnson

(10) Patent No.: US 12,631,873 B2
(45) Date of Patent: May 19, 2026

(54) IR REFLECTIVE MULTILAYER OPTICAL FILMS

(71) Applicant: 3M INNOVATIVE PROPERTIES COMPANY, St. Paul, MN (US)

(72) Inventor: Matthew B. Johnson, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 753 days.

(21) Appl. No.: 18/080,076

(22) Filed: Dec. 13, 2022

(65) Prior Publication Data

US 2023/0204951 A1     Jun. 29, 2023

Related U.S. Application Data

(60) Provisional application No. 63/266,115, filed on Dec. 29, 2021.

(51) Int. Cl.
*G02B 27/00*        (2006.01)
*G02B 5/08*         (2006.01)

(52) U.S. Cl.
CPC ....... *G02B 27/0093* (2013.01); *G02B 5/0841* (2013.01)

(58) Field of Classification Search
CPC .......................... G02B 27/0093; G02B 5/0841
USPC ........................................................ 359/359
See application file for complete search history.

(56) References Cited

U.S. PATENT DOCUMENTS

2020/0319389 A1*  10/2020  Yun ...................... G02B 27/283

* cited by examiner

*Primary Examiner* — Bumsuk Won
*Assistant Examiner* — Grant A Gagnon
(74) *Attorney, Agent, or Firm* — Jonathan L. Tolstedt

(57) ABSTRACT

An integral optical stack including a structured optical film having alternating first and second segments including plurality of polymeric layers. Each pair of first and second segments define an inclusion angle of between about 50 degrees and about 110 degrees therebetween. Planarizing films are disposed on opposite first and second sides of the structured optical film. Each of the first and second sides has an average peak-to-valley nonlinearity. The planarizing films reduce the average peak-to-valley nonlinearity of the corresponding side of the structured optical film by at least a factor of 2. For each incident angle of between about zero and 30 degrees, the plurality of polymeric layers in each of the first and second segments has an average optical transmittance of greater than about 70% in a visible wavelength range and an optical reflectance of greater than about 60% for at least one wavelength in an infrared wavelength range.

10 Claims, 5 Drawing Sheets

| | Tp0 | Tp10 | Tp20 | Tp30 | Tp40 | Tp50 | Tp60 | Tp70 | Tp80 |
|---|---|---|---|---|---|---|---|---|---|
| 420-680 | 0.92 | 0.92 | 0.93 | 0.95 | 0.97 | 0.99 | 0.98 | 0.89 | 0.55 |

IR REFLECTIVE MULTILAYER OPTICAL FILMS

TECHNICAL FIELD

The disclosure generally relates to optical films, and optical systems including such films to track a viewer's eye.

BACKGROUND

Multilayer optical films (MOF) are used in display systems and other applications, including consumer electronic applications and automotive applications. In some cases, the display systems may include infrared (IR) reflective polymeric films that reflect wavelengths of light in the infrared region while allowing visible light to pass through.

SUMMARY

Some aspects of the disclosure relate to an integral optical stack including a structured optical film having a plurality of at least two alternating first and second segments extending along a length and arranged along a width of the structured optical film. Each of the first and second segments include a plurality of polymeric layers numbering at least 10 in total. Each of the polymeric layers having an average thickness of less than about 500 nm. Each pair of adjacent first and second segments define an inclusion angle of between about 50 degrees and about 110 degrees therebetween. Substantially planarizing first and second films are disposed on opposite major first and second sides of the structured optical film and substantially conform to and substantially planarize the at least two alternating first and second segments along the length and the width of the optical film. Each of the first and second sides of the structured optical film has an average peak-to-valley nonlinearity due to the alternating first and second segments. Each of the planarizing first and second films reduces the average peak-to-valley nonlinearity of the corresponding side of the structured optical film by at least a factor of 2. For at least one of s- and p-polarized incident lights and for each incident angle of between about zero and 30 degrees, the plurality of polymeric layers in each of the first and second segments of the structured optical film has an average optical transmittance of greater than about 70% in a visible wavelength range extending from about 420 nm to about 680 nm and an optical reflectance of greater than about 60% for at least one wavelength in an infrared wavelength range extending from about 750 nm to about 1200 nm.

Other aspects of the disclosure relate to an optical construction including a plurality polymeric layers disposed between opposing substantially planar substantially parallel first and second major surfaces extending along a length and width directions of the optical construction. The polymeric layers number at least 10 in total and each of the polymeric layers has an average thickness of less than about 500 nm. The plurality of polymeric layers is shaped into a plurality of at least two alternating first and second segments extending along the length direction and arranged along the width direction. For a substantially normally incident light, for at least one polarization state, and for a visible wavelength range extending from about 420 nm to about 680 nm and an infrared wavelength range extending from about 750 nm to about 1200 nm, the optical construction has an average optical transmittance of greater than about 70% in the visible wavelength range and an average optical reflectance of greater than about 60% of the incident light in a direction that makes a first angle of greater than about 20 degrees with the incident light for at least one wavelength in the infrared wavelength range.

Some other aspects of the disclosure relate to an optical system for tracking a viewer's eye including the optical construction of one or more embodiments of this disclosure and an optical transceiver configured to at least one of emit and detect light having the at least the one wavelength in the infrared wavelength range.

BRIEF DESCRIPTION OF DRAWINGS

The various aspects of the disclosure will be discussed in greater detail with reference to the accompanying figures where, FIG. 1 schematically shows an optical stack including a structured optical film according to some embodiments.

The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

In the following description, reference is made to the accompanying drawings that form a part hereof and in which various embodiments are shown by way of illustration. It is to be understood that other embodiments are contemplated and may be made without departing from the scope or spirit of the present description. The following detailed description, therefore, is not to be taken in a limiting sense.

MOF based IR mirror films improve thermal performance by reflecting infrared light. 3M™ UCSF (Ultra Clear Solar Film) is one such MOF based IR mirror film that has a transmittance of about 90% in visible light without affecting the display quality and a reflectance of about 90% in the NIR (800-1200 nm) region of light. Embodiments disclosed herein relate to optical constructions for managing the reflectivity in IR and NIR range more specifically at a given angle and transmit at other angles.

Figure 1:
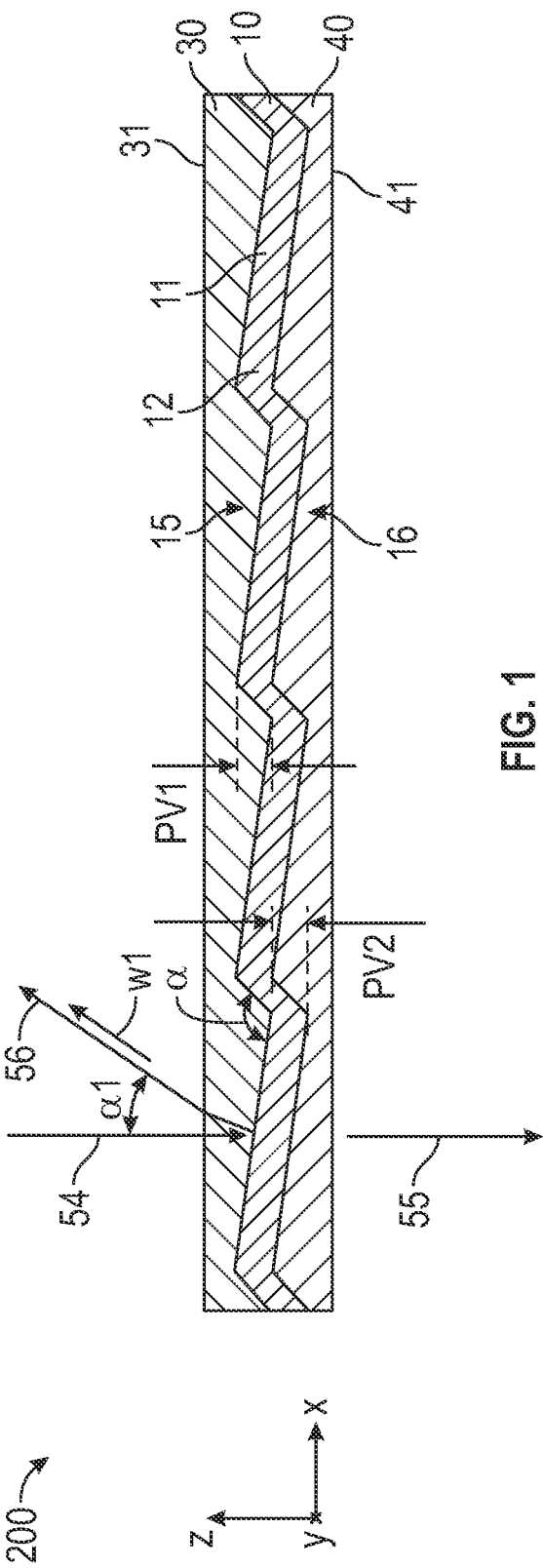

Some embodiments of an optical construction (200) including a multilayer structured optical film (10) are shown in FIG. 1. The optical construction (200) may be an optical stack in some embodiments, and the structured optical film (10) may include a plurality of at least two alternating first (11) and second (12) segments extending along a length (y-axis), and arranged along a width (x-axis), of the structured optical film (10).

Figure 2:
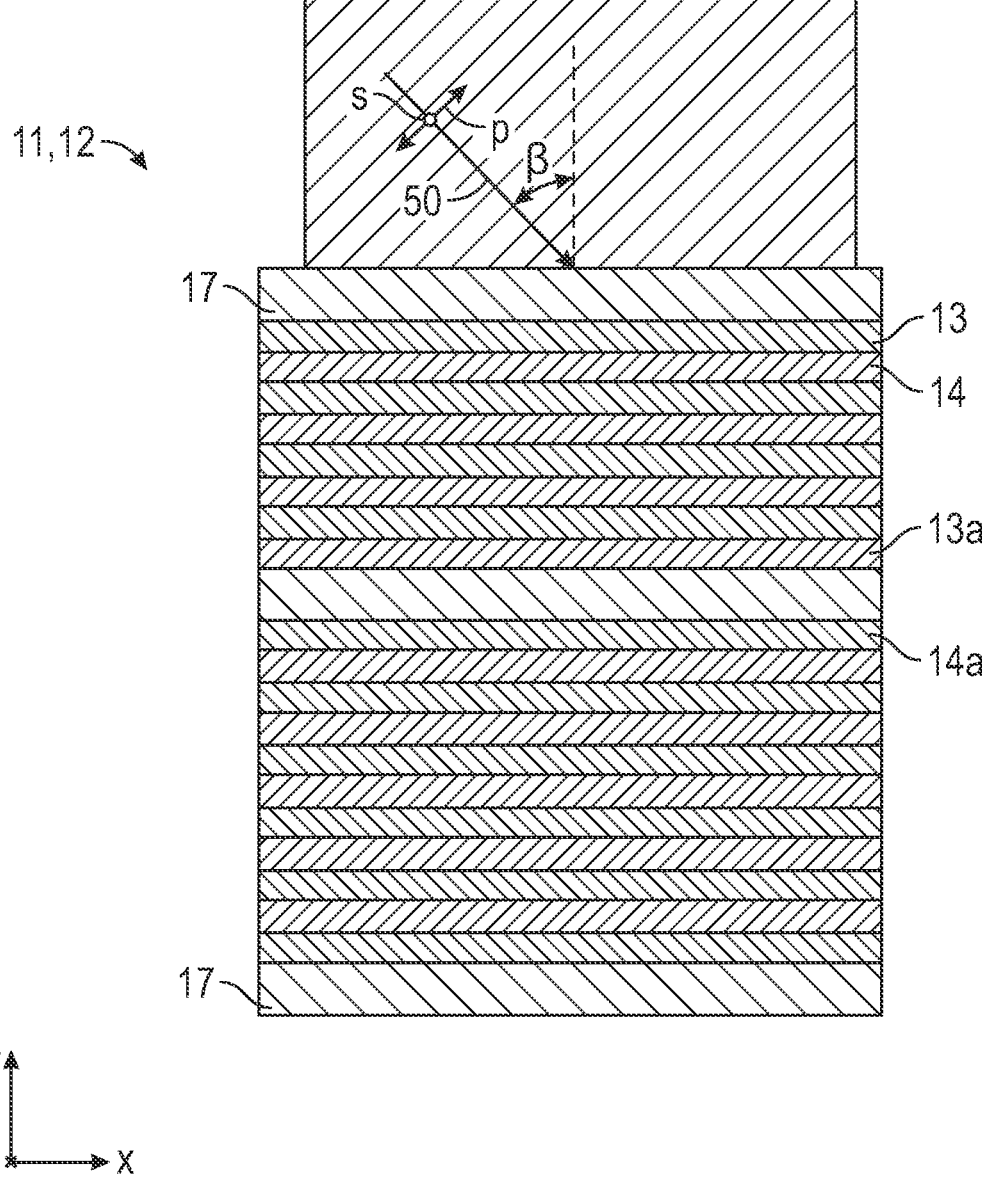
FIG. 2 schematically shows the construction of the structured optical film according to some embodiments.

Each of the first (11) and second (12) segments may include a plurality of polymeric layers (13, 14) as shown in FIG. 2. The plurality of polymeric layers (13, 14) may be shaped into the plurality of at least two alternating first (11) and second (12) segments extending along the length direction (y-axis) and arranged along the width (x-axis) direction. For instance, the plurality of polymeric layers (13, 14) may be thermoformed into a saw-tooth (Fresnel) shape to form the plurality of at least two alternating first (11) and second (12) segments.

The plurality of polymeric layers (13, 14) may include at least 10, or 20, or 50, or 75, or 100, or 150, or 200, or 250, or 300, or 400 layers in total. The average thickness of each of the polymeric layers (13, 14) may be less than about 500 nm, or less than 400 nm, or less than 350 nm, or less than 300 nm, or less than 250 nm or less than 200 nm. In some embodiments, the number of layers may be selected to achieve the desired optical properties using the minimum number of layers for reasons of film thickness, flexibility and economy.

In some aspects, the polymeric layers (13, 14) of the first segments (11) may correspond one-to-one with the polymeric layers (13, 14) of the second segments (12). In some aspects, the corresponding polymeric layers (13, 14) of the first (11) and second (12) segments may form continuous polymeric layers across the structured optical film (10).

In some cases, each of the first (11) and second (12) segments of the structured optical film (10) may further include one or more skin layers (17) disposed on the plurality of polymeric layers (13, 14). Each of the skin layers (17) may have an average thickness of greater than about 500 nm, or greater than 600 nm, or greater than 700 nm, or greater than 800 nm, or greater than 900 nm, or greater than 1000 nm. The skin layers (17) and the plurality of polymeric layers (13, 14) may be bonded with each other using adhesives. The skin layer (17), for instance, may be made of polycarbonate or polycarbonate alloy, or polyethylene terephthalate (PET), or polystyrene (PS), or a combination thereof.

In some embodiments, the plurality of polymeric layers (13, 14) may include a plurality of alternating polymeric different first (13) and second (14) layers. For instance, the structured optical film (10) may include alternating first (13) and second (14) polymeric layers including at least one birefringent polymer (e.g. oriented semi-crystalline polymer) and one second polymer.

In other embodiments, the materials of first and second layers (13, 14) may be composed of polymers such as polyesters. For instance, an exemplary polymer useful as a first birefringent layer (13) may be polyethylene naphthalate (PEN). Other semicrystalline polyesters suitable as birefringent polymers as the first birefringent layer (13) in the multilayer polymeric film may include, for example, polybutylene 2,6-naphthalate (PBN), polyethylene terephthalate (PET), or the like. The second polymer layer (14) can be made from a variety of polymers having glass transition temperatures compatible with that of the first birefringent polymer layer (13) and having a refractive index similar to the isotropic refractive index of the first birefringent polymer layer (13). Examples of other polymers suitable for use in optical films and, particularly, in the second polymer layer (14) may include vinyl polymers and copolymers made from monomers such as vinyl naphthalenes, styrene, maleic anhydride, acrylates, and methacrylates. Examples of such polymers for the second polymer layer (14) include polyacrylates, polymethacrylates, such as poly methyl methacrylate (PMMA), and isotactic or syndiotactic polystyrene. Other polymers include condensation polymers such as polysulfones, polyamides, polyurethanes, polyamic acids, and polyimides. In addition, the second polymer layer (14) can be formed from homopolymers and copolymers of polyesters, polycarbonates, fluoropolymers, and polydimethylsiloxanes, and blends thereof. The layers can be selected to achieve the reflection of a specific bandwidth of electromagnetic radiation.

In one embodiment, the materials of the plurality of layers (13, 14) may have differing indices of refraction. In some embodiments, the structured optical film (10) may include PET as the first optical layer (13) and co polymers of PMMA (coPMMA), or any other polymer having low refractive index, including copolyesters, fluorinated polymers or combinations thereof as the second optical layer (14). The transmission and reflection characteristics of the structured optical film (10) may be based on coherent interference of light caused by the refractive index difference between the layers (13, 14) and the thicknesses of layers (13, 14).

Figure 4:
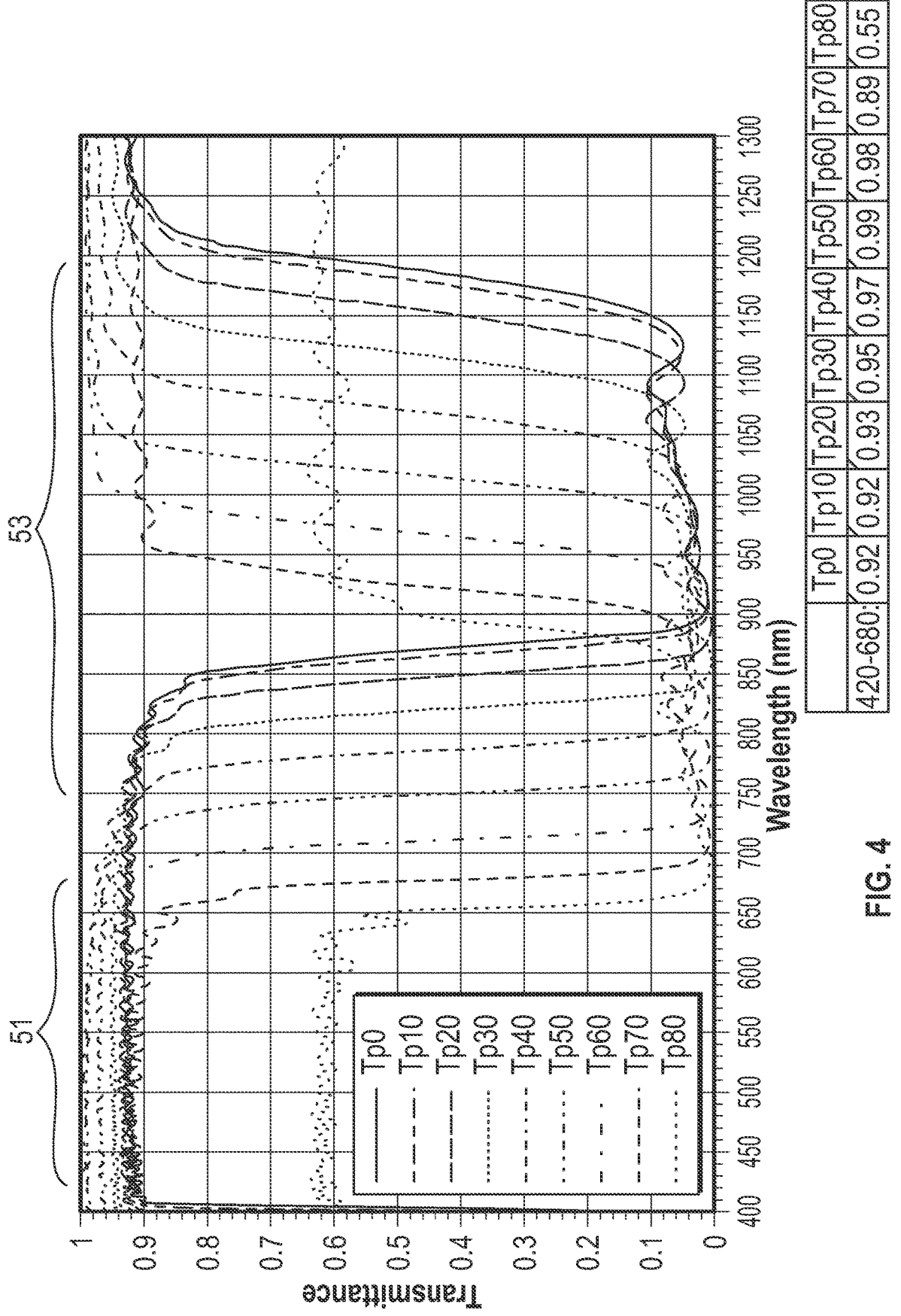
FIG. 4 shows the optical transmittance versus wavelength of the structured optical film at different incident angles.

As shown in FIGS. 2 and 4, in some aspects, for at least one of s- and p-polarized incident lights (50) and for each incident angle (β) of between about 0 and 30 degrees, the plurality of polymeric layers (13, 14) in each of the first (11) and second (12) segments of the structured optical film (10) may have an average optical transmittance of greater than about 70% in a visible wavelength range (51) extending from about 420 nm to about 680 nm. In some cases, the structured optical film (10) may have an average optical transmittance of greater than about 75%, or greater than about 80%, or greater than about 85%, or greater than about 90%, or greater than about 95% in the visible wavelength range (51) extending from about 420 nm to about 680 nm.

Figure 3:
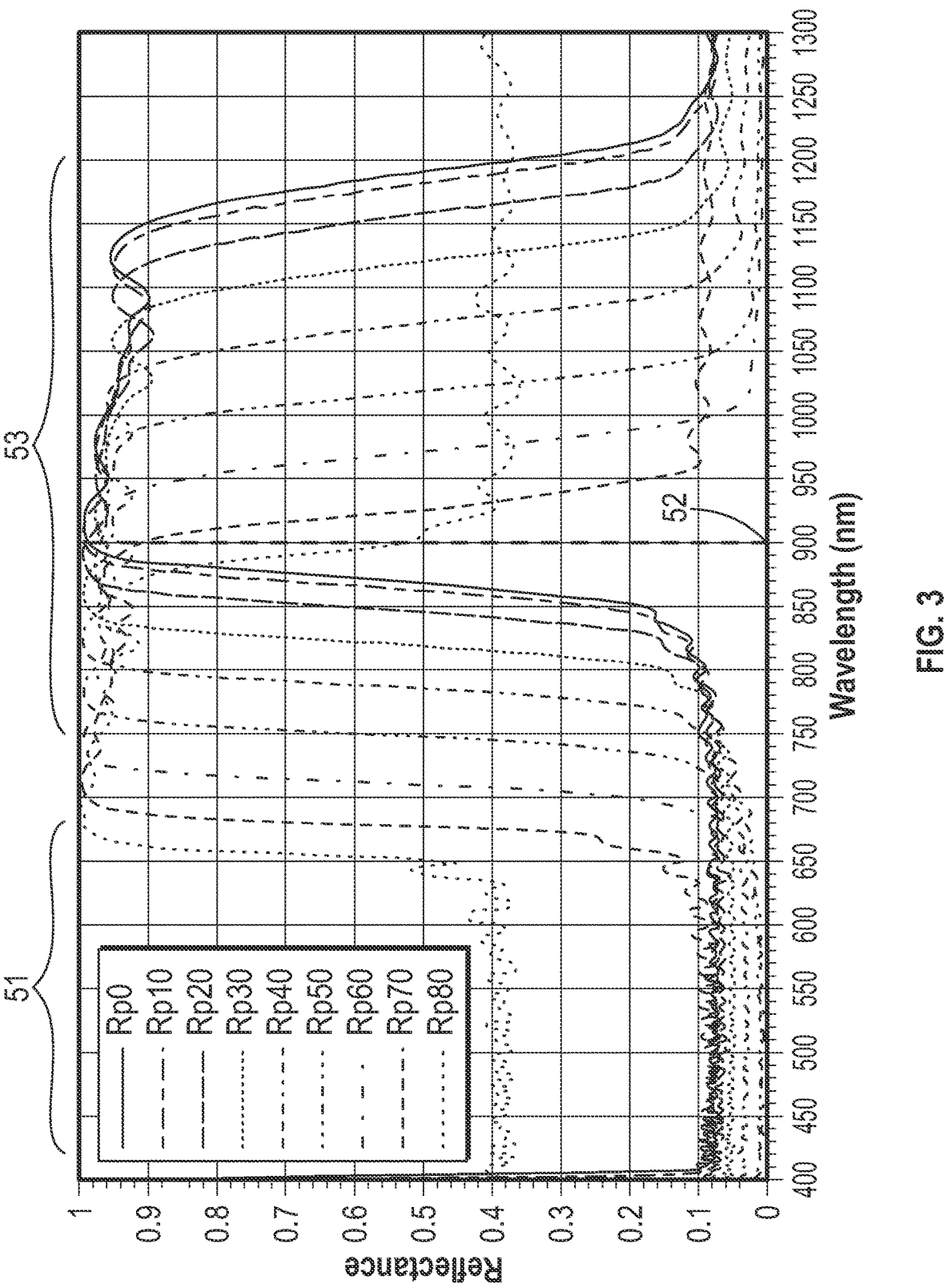
FIG. 3 shows the optical reflectance versus wavelength of the structured optical film at different incident angles.

In other aspects, as shown in FIGS. 2 and 3, for at least one of s- and p-polarized incident lights (50) and for each incident angle (β) of between about 0 and 30 degrees, the plurality of polymeric layers (13, 14) in each of the first (11) and second (12) segments of the structured optical film (10) may have an optical reflectance of greater than about 60% for at least one wavelength (52) in an infrared wavelength range (53) extending from about 750 nm to about 1200 nm. In some cases, the structured optical film (10) may have an optical reflectance of greater than about 65%, or greater than about 70%, or greater than about 75%, or greater than about 80%, or greater than about 85%, or greater than about 95%, or greater than about 96% for at least one wavelength (52) in an infrared wavelength range (53) extending from about 750 nm to about 1200 nm.

In some aspects, the plurality of polymeric layers (13, 14) of the optical construction (200) may be disposed between first (31) and second (41) major surfaces of the optical construction (200). The first (31) and second (41) major surfaces are arranged to extend along a length (y-axis) and width (x-axis) directions of the optical construction (200). The first (31) and second (41) major surfaces are disposed opposite each other and may be substantially planar substantially parallel to each other.

In some embodiments, each pair of adjacent first (11) and second (12) segments may define an inclusion angle (α) as shown in FIG. 1. The inclusion angle (α) may be between about 50 degrees and about 110 degrees, or between about 60 degrees and about 100 degrees, or between about 70 degrees and about 90 degrees, or between about 75 degrees and about 85 degrees therebetween.

In some embodiments, a substantially planarizing first film (30) may be disposed on a major first side (15) of the structured optical film (10). A substantially planarizing second film (40) may be disposed on a major second side (16), opposite the major first side (15), of the structured optical film (10). The first (30) and second (40) substantially planarizing films may substantially conform to and substantially planarize the at least two alternating first (11) and second (12) segments along the length (y-axis) and the width (x-axis) of the structured optical film (11). The substantially planarizing first (30) and second (40) films are chosen to essentially index match the structured optical film (10) at least in the visible wavelength range.

In some aspects, the first side (15) of the structured optical film (10) has an average peak-to-valley nonlinearity (PV1) due to the alternating first and second segments. The planarizing first film (30) may reduce the average peak-to-valley nonlinearity (PV1) of the first side (15) of the structured optical film (10) by at least a factor of 2, or 3, or 4, or 5, or 7, or 10, or 20, or 50, or 75, or 100.

Further, the second side (16) of the structured optical film (10) has an average peak-to-valley nonlinearity (PV2) due to the alternating first (11) and second (12) segments. The planarizing second film (40) may reduce the average peak-to-valley nonlinearity (PV2) of the second side (16) of the structured optical film (10) by at least a factor of 2, or 3, or 4, or 5, or 7, or 10, or 20, or 50, or 75, or 100.

Normally incident visible light is ideally un-deflected by the structured optical film (10) that acting as a clear window for visible light. In some embodiments, as shown in FIGS. 1 and 4, for a substantially normally incident light (54), for at least one polarization state (p-pol), and for a visible wavelength range (51) extending from about 420 nm to about 680 nm, the optical construction (200) may have an average optical transmittance (55) of greater than about 70%. In some cases, the optical construction (200) may have an average optical transmittance (55) of greater than about 75%, or greater than about 80%, or greater than about 85%, or greater than about 90%, or greater than about 95%, or greater than about 97% in the visible wavelength range (51).

Normally incident infrared light is reflected by the structured optical film (10). In some embodiments, as shown in FIGS. 1 and 3, for a substantially normally incident light (54), for at least one polarization state (p-pol), and for an infrared wavelength range (53) extending from about 750 nm to about 1200 nm, the optical construction (200) may have an average optical reflectance (56) of greater than about 60%. In some cases, the optical construction (200) may have an average optical reflectance (56) of greater than about 65%, or greater than about 70%, or greater than about 75%, or greater than about 80%, or greater than about 85%, or greater than about 95%, or greater than about 96% in the infrared wavelength range (53).

In the embodiment illustrated in FIG. 1, the optical construction (200) reflects (56) the normally incident light (54) in a direction (w1). The direction (w1) may make a first angle (α1) of greater than about 20 degrees, or greater than about 25 degrees, or greater than about 30 degrees with the incident light (54) for at least one wavelength (52) in the infrared wavelength range (53). In some aspects, the first angle (α1) is determined at least by the inclusion angle (α) and the refractive index of the planarizing film (30) on the reflection side of the optical construction (200).

Figure 5:
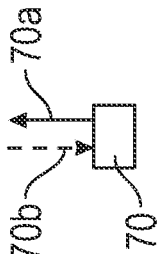
FIG. 5 schematically shows an optical system for tracking a viewer's eye according to some embodiments.
Figure 5:
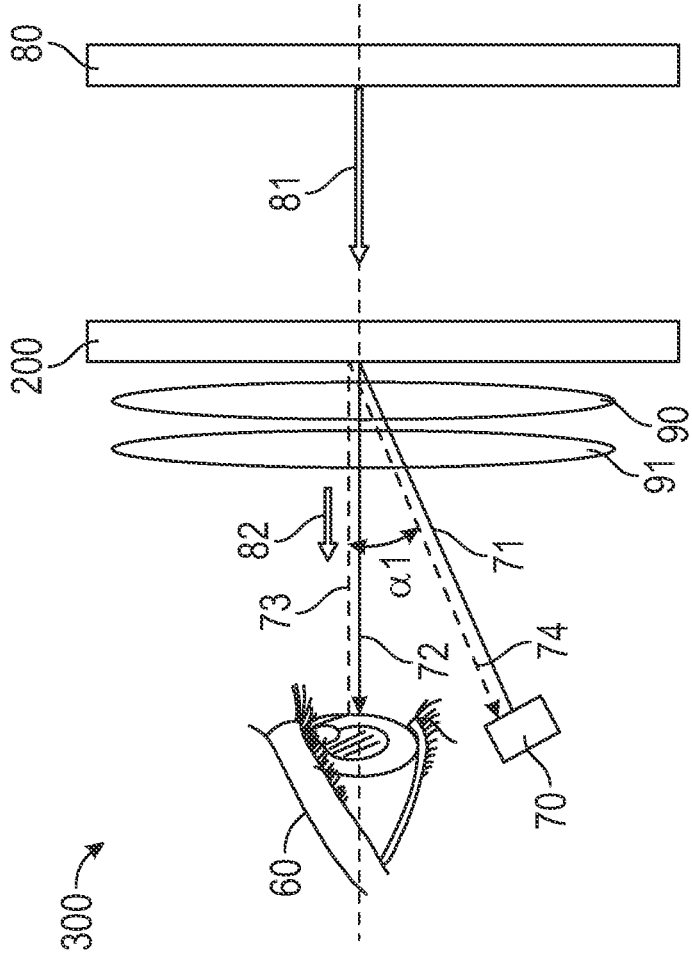
Figure 5:
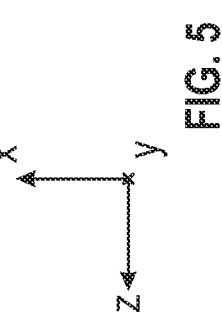

FIG. 5 schematically shows an optical system (300) for tracking a viewer's eye (60) including the optical construction (200) as described in one or more embodiments of this disclosure. The optical system (300) includes a display (80). The display (80) may be configured to emit an image light (81) toward the viewer's eye. The optical construction (200) may be configured to transmit at least a portion (82) of the image light (81) toward the viewer's eye (60). In some aspects, the emitted image light (81) may be substantially normally incident on the optical construction (200).

In some instances, the optical system (300) may include one or more optical lenses (90, 91). The optical construction (200) may be disposed between the display (80) and the one or more optical lenses (90, 91).

The optical system (300) according to some embodiments may further include an optical transceiver (70) configured to emit (70a) and/or detect (70b) light having the at least the one wavelength (52) in the infrared wavelength range (53). The optical transceiver (70) may be configured to emit a first light (71) having the at least the one wavelength (52) in the infrared wavelength range (53) toward the optical construction (200). The emitted first light (71) may be incident on the optical construction (200) at an incident angle (α1). The incident angle (α1) may be substantially equal to the first angle (α1) as shown in FIG. 1.

In some embodiments, the optical construction (200) may reflect greater than about 60% of the incident light (71) as a first reflected light (72) having the at least the one wavelength (52) toward the viewer's eye (60) in a first direction (z-axis) substantially orthogonal to the optical construction (200). In some instances, the optical construction (200) may reflect greater than about 65%, or greater than about 70%, or greater than about 75%, or greater than about 80%, or greater than about 85%, or greater than about 95%, or greater than about 96% of the incident light (71) as the first reflected light (72) having the at least the one wavelength (52) toward the viewer's eye (60) in the first direction (z-axis).

The viewer's eye (60) may reflect at least a portion of the first reflected light (72) as a second reflected light (73) having the at least the one wavelength (52) along the first direction (z-axis) toward the optical construction (200). The optical transceiver (70) may be configured to detect at least a portion (74) of the second reflected light (73) reflected by the optical construction (200).

The invention claimed is:

1. An integral optical stack comprising:

a structured optical film comprising a plurality of at least two alternating first and second segments extending along a length, and arranged along a width, of the structured optical film, each of the first and second segments comprising a plurality of polymeric layers numbering at least 10 in total, each of the polymeric layers having an average thickness of less than about 500 nm, each pair of adjacent first and second segments defining an inclusion angle of between about 50 degrees and about 110 degrees therebetween; and substantially planarizing first and second films disposed on opposite major first and second sides of the structured optical film and substantially conforming to and substantially planarizing the at least two alternating first and second segments along the length and the width of the optical film, wherein, each of the first and second sides of the structured optical film has an average peak-to-valley nonlinearity due to the alternating first and second segments, and each of the planarizing first and second films reduces the average peak-to-valley nonlinearity of the corresponding side of the structured optical film by at least a factor of 2; and wherein, for at least one of s- and p-polarized incident lights and for each incident angle of between about zero and 30 degrees, the plurality of polymeric layers in each of the first and second segments of the structured optical film has:

an average optical transmittance of greater than about 70% in a visible wavelength range extending from about 420 nm to about 680 nm; and an optical reflectance of greater than about 60% for at least one wavelength in an infrared wavelength range extending from about 750 nm to about 1200 nm.

2. The integral optical stack of claim 1, wherein polymeric layers of the first segments correspond one-to-one with the polymeric layers of the second segments.

3. The integral optical stack of claim 2, wherein the corresponding polymeric layers of the first and second segments form continuous polymeric layers across the structured optical film.

4. The integral optical stack of claim 1, wherein each of the first and second segments further comprises one or more skin layers, each of the skin layers having an average thickness of greater than about 500 nm.

5. An optical construction comprising a plurality polymeric layers disposed between opposing substantially planar substantially parallel first and second major surfaces extending along a length and width directions of the optical construction, the polymeric layers numbering at least 10 in total, each of the polymeric layers having an average thickness of less than about 500 nm, the plurality of polymeric layers shaped into a plurality of at least two alternating first and second segments extending along the length direction and arranged along the width direction, such that for a substantially normally incident light, for at least one polarization state, and for a visible wavelength range extending from about 420 nm to about 680 nm and an infrared wavelength range extending from about 750 nm to about 1200 nm, the optical construction has an average optical transmittance of greater than about 70% in the visible wavelength range and reflects greater than about 60% of the incident light in a direction that makes a first angle of greater than about 20 degrees with the incident light for at least one wavelength in the infrared wavelength range.

6. An optical system for tracking a viewer's eye comprising the optical construction of claim 5 and an optical transceiver configured to at least one of emit and detect light having the at least the one wavelength in the infrared wavelength range.

7. The optical system of claim 6, wherein the optical transceiver is configured to:

emit a first light having the at least the one wavelength in the infrared wavelength range toward the optical construction, the emitted first light incident on the optical construction at an incident angle substantially equal to the first angle, the optical construction reflecting greater than about 60% of the incident light as a first reflected light having the at least the one wavelength toward the viewer's eye in a first direction substantially orthogonal to the optical construction, the viewer's eye reflecting at least a portion of the first reflected light as a second reflected light having the at least the one wavelength along the first direction toward the optical construction; and detect at least a portion of the second reflected light reflected by the optical construction.

8. The optical system of claim 6 further comprising a display configured to emit an image light toward the viewer's eye, the optical construction configured to transmit at least a portion of the image light toward the viewer's eye.

9. The optical system of claim 8, wherein the emitted image light is substantially normally incident on the optical construction.

10. The optical system of claim 8 further comprising one or more optical lenses, the optical construction disposed between the display and the one or more optical lenses.

* * * * *